J. F. MILLER.
DRAW GEAR AND BUFFING APPARATUS.
APPLICATION FILED DEC. 30, 1908.
1,119,854.
Patented Dec. 8, 1914.
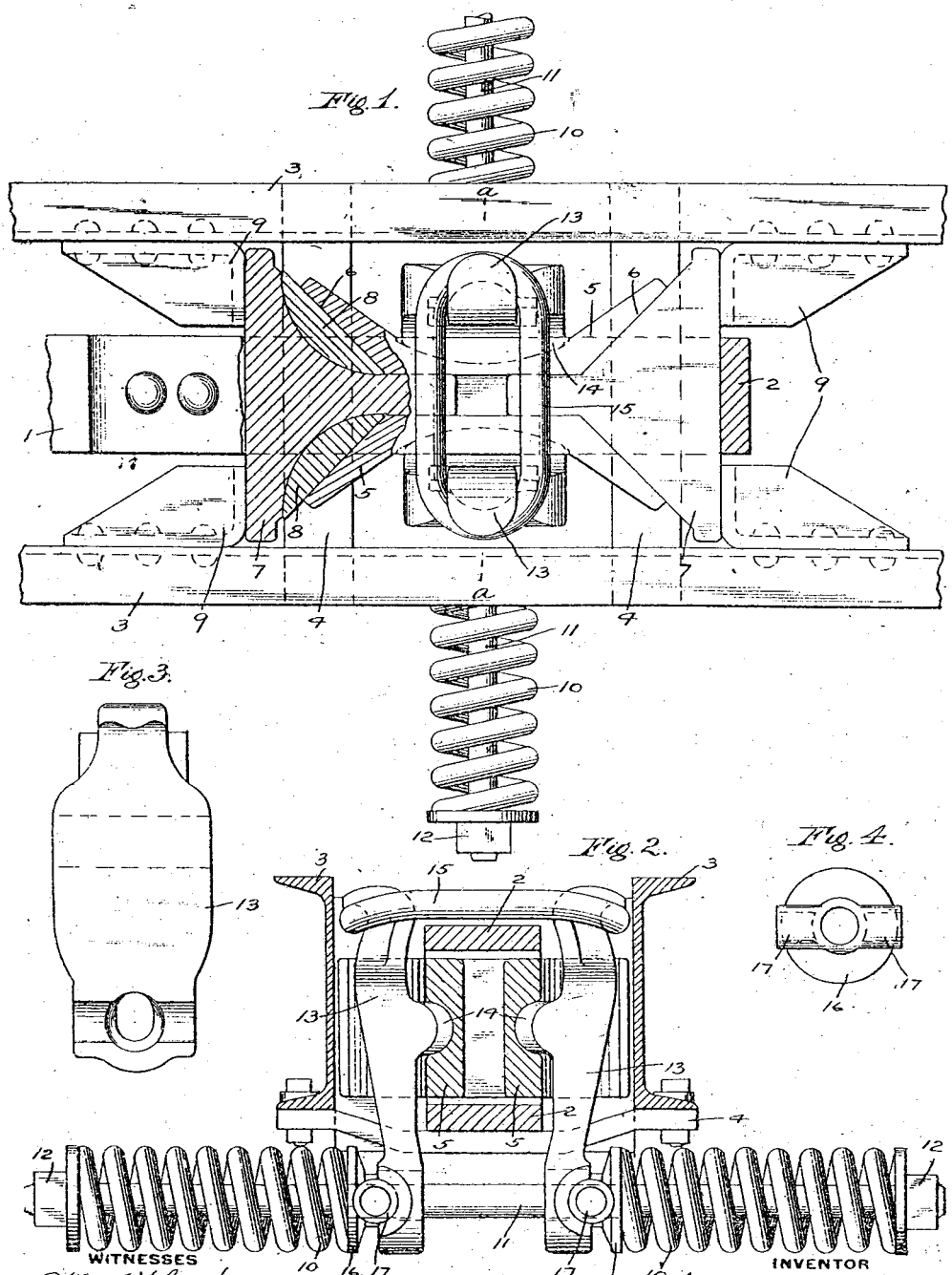

UNITED STATES PATENT OFFICE.

JOHN F. MILLER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DRAW-GEAR AND BUFFING APPARATUS.

1,119,854.    Specification of Letters Patent.    Patented Dec. 8, 1914.

Application filed December 30, 1908. Serial No. 470,024.

*To all whom it may concern:*

Be it known that I, JOHN F. MILLER, a citizen of the United States, residing at Edgewood, in the county of Allegheny and State of Pennsylvania, have invented new and useful Improvements in Draw-Gear and Buffing Apparatus, of which the following is a specification.

This invention relates to friction draft gear employed on railways cars, as well known, for the purpose of taking up and absorbing shocks and strains due to draft and buffing.

In modern car construction, where steel center sills are employed, the friction draft gear mechanism is necessarily located between the sills. The space available for the draft gear is therefore more or less confined, and the gear parts, particularly the spring mechanism, must be limited in size to correspond with this space.

It has heretofore been proposed to locate the friction elements of the draft gear between the sills, as formerly, but to dispose the spring mechanism outside or exteriorly of the sills, so that ordinary springs of substantially any desired size could be employed for the spring mechanism, while also rendering the mechanism accessible for inspection and repairs, such as replacement of springs in case of breakage and the like. This prior construction, however, necessitated slotting the sills in order to provide openings through which the spring mechanism could be connected to the friction elements.

In order to avoid this undesirable slotting of the sills, one feature of my invention contemplates interposing a mechanical connection, such as a lever mechanism, for example, between the friction elements of the draft gear and the spring mechanism, so that the spring mechanism may be located below or in any desired position outside of the center sills without piercing the sills to connect the spring mechanism with the friction elements.

Other objects and advantages will be hereinafter noted in the more detailed description of my improvement.
In the accompanying drawing, Figure 1 is a top plan view, partly in section, of a friction draft gear embodying my invention; Fig. 2 a transverse section thereof on the line *a—a* of Fig. 1; Fig. 3 a side view of one of the connecting levers; and Fig. 4 a detail view of one of the spring bearing washers.

As shown in the drawing, a draw-bar 1 provided with yoke 2 is mounted between center sills 3, 3 of a railway car and is adapted to move longitudinally, the yoke 2 being supported upon cross bars 4, 4 secured to the under side of the center sills 3, 3. Within the yoke is carried the friction mechanism comprising laterally movable opposed friction blocks 5, 5, each provided with oppositely inclined friction surfaces 6, 6 adapted to frictionally engage longitudinally movable wedge blocks. The wedge blocks are preferably made up of main castings 7, 7 having oppositely concaved surfaces forming bearings for friction strips 8, 8 so that the strips 8, 8 may rock on said concaved surfaces. These strips have friction faces adapted to bear on the friction surfaces of the wedge blocks 5, 5 and the rocking movement of the strips on the concave bearing surfaces permit the friction faces thereof to automatically adjust themselves to the corresponding friction surfaces of the friction blocks 5, 5, as will be apparent. The main wedge castings 7, 7 extend inwardly between the friction blocks 5, 5 and thereby limit the relative longitudinal movement as desired according to the amount of space left between the extended portions of the opposite wedge castings.

The outward longitudinal movement of the main wedge castings is limited by stops or abutments 9, 9, suitably secured to the center sills at the outer sides of the castings. The yielding resistance mechanism may comprise coil springs 10, 10 extending out laterally on each side of the center sills and carried by a bolt 11 having a nut 12 on each opposite end for adjusting the tension of the springs as desired. The springs act on the friction blocks 5, 5 through levers 13, 13 each provided at an intermediate point with a convex rounded projecting portion 14 and adapted to bear and have a rocking movement in corresponding recesses in the friction blocks 5, 5, the upper ends of the levers 13, 13 being connected together by a link 15 and the lower ends having semi-circular recesses within which corresponding rocker segments 17, 17 of bearing washers 16, 16 engage, the bearing washers being adapted to engage the inner ends of the coil springs 10, 10. With this construction the spring mechanism is carried by and moves longitudinally with the friction blocks 5, 5, so that in the draft and buffing movements of the parts, one of the wedge block members being held against longitudinal movement by the corresponding pair of stops 9, 9, the movement of the other wedge block forces the opposite friction blocks 5, 5 apart laterally, the blocks riding up on the inclined faces of both pairs of friction strips 8, 8, thus utilizing the friction surfaces of all the elements when the gear is in action. The lateral movement of the friction blocks 5, 5 is transmitted to the spring mechanism through the levers 13, 13, so that the springs 10, 10 are compressed and thereby act to resist or oppose the movement of the friction elements. This construction permits of a spring movement greater than the corresponding movement of the friction elements and with the spring arm of the levers longer than the link arm, as shown in the drawing, the movement of the springs is more than double the movement of the friction elements. The effective resistance of the springs to the movement of the friction elements is thus increased, so that for a given desired resistance lighter springs may be employed as compared to direct acting springs.

It will now be evident that the present construction obviates the necessity for slotting the center sills of the car while possessing the advantages of the outside hung spring mechanism.

Having now described my invention, what I claim as new and desire to secure by Letters Patent, is:—

1. In a friction draft gear, the combination with longitudinally movable friction blocks and coöperating laterally movable friction blocks disposed between the center sills of the car, of a transversely arranged spring located below and extending horizontally beyond the sides of the car sills, and a lever mechanism for transmitting the lateral thrust of the friction blocks to said spring.

2. In a friction draft gear, the combination with longitudinally movable friction blocks and coöperating laterally movable friction blocks disposed between the center sills of the car, of a pair of transversely arranged springs located below and extending beyond the sides of the car sills, and mechanism for transmitting the lateral thrust of the friction blocks to said springs.

3. In a friction draft gear, the combination with longitudinally movable wedge blocks and opposite laterally movable friction blocks disposed between the center sills of the car, of levers engaging said friction blocks and extending below the sills, and transverse springs opposing the outward movement of said levers below the sills and extending beyond the sides of the sills.

4. In a friction draft gear, the combination with longitudinally movable wedge blocks and opposite laterally movable friction blocks disposed between the center sills of the car, of levers engaging said friction blocks and extending below the sills, a link connecting the tops of said levers, and a transversely arranged spring device connecting the lower ends of said levers below the car sills.

5. In a friction draft gear, the combination with a longitudinally movable friction element comprising a main block having a curved seat and a strip provided with a corresponding surface engaging said seat, and having an inclined frictional face, of a laterally movable friction element having a coöperating frictional face, and a spring opposing the movement of said friction elements.

In testimony whereof I have hereunto set my hand.

JOHN F. MILLER.

Witnesses:
W<small>M</small>. M. C<small>ADY</small>,
A. M. C<small>LEMENTS</small>.